UNITED STATES PATENT OFFICE.

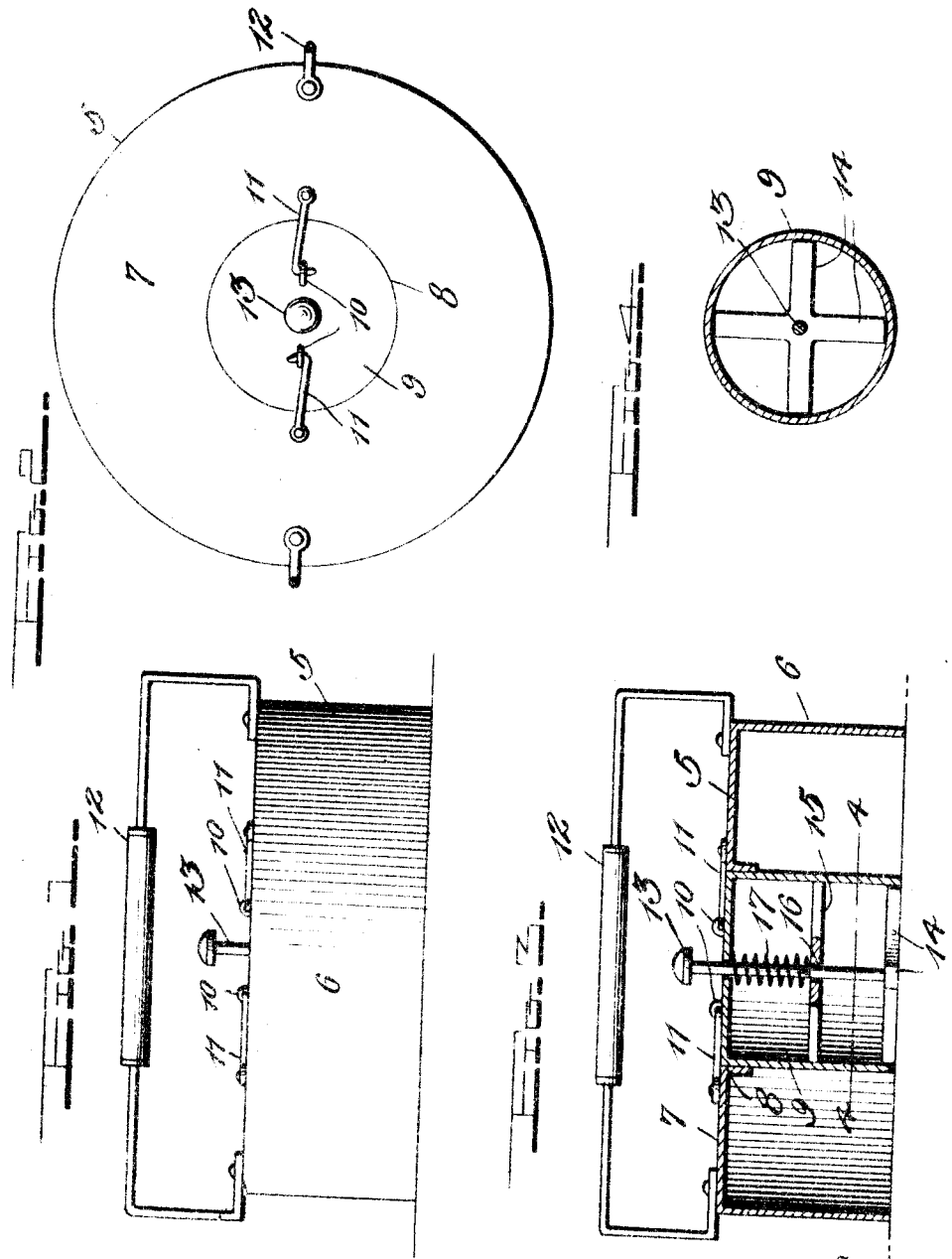

IDA L. HAINES, OF PARRY, NEW JERSEY.

DOUGH-CUTTER.

1,088,070.   Specification of Letters Patent.   Patented Feb. 24, 1914.

Application filed June 1, 1912. Serial No. 701,082.

*To all whom it may concern:*

Be it known that I, IDA L. HAINES, a citizen of the United States, residing at Parry, in the county of Burlington and State of New Jersey, have invented certain new and useful Improvements in Dough-Cutters, of which the following is a specification, reference being had to the accompanying drawings.

This invention relates to improvements in cake cutting devices and has for its primary object to provide a simple, efficient and easily operated device of this character whereby dough may be cut in a desired form to be baked into a cake, with or without the center thereof removed.

A further object of the invention is to provide a combination cake and doughnut cutter consisting of inner and outer cutting members and means for removably securing the inner cutting member to the outer member.

Another object of the invention is to provide improved means arranged within the inner cutter to force the dough from the opening formed by said inner cutter.

With the above and other objects in view, the invention consists of the novel features of construction, combination and arrangement of parts hereinafter fully described and claimed, and illustrated in the accompanying drawing, in which—

Figure 1 is a side elevation of a cake cutter embodied in the present invention. Fig. 2 is a top plan view. Fig. 3 is a vertical section, and Fig. 4 is a section taken on the line 4—4 of Fig. 3.

Referring in detail to the drawing 5 designates the body or outer cutting member of the device which is of cylindrical form and consists of the annular wall 6 and the end wall 7 said latter wall being provided with a central opening 8 to receive the closed end of the inner cutting member 9. This inner cutting member has its annular wall arranged in spaced relation to the wall of the outer member 5 and is provided on its closed end with eyes 10 to receive suitable hooks 11 pivotally mounted upon the end wall 7 of the outer cutting member 5. A suitable bail or handle 12 is secured to said outer member whereby the device may be conveniently handled.

The closed end of the inner cutting member 9 is provided with a central opening to receive the cylindrical stem 13 of a pressure member. One end of this pressure member is provided with the radial arms 14 which are movable within the cylindrical cutter 9 and are adapted to force the dough therefrom. The other end of the stem 13 which projects above the closed end of the outer cutting member 5 is provided with a head for engagement by the finger of the operator. A horizontal bar 15 is fixed at its ends to the annular wall of the inner cutter 9 at diametrically opposed points and is provided with a central opening 16 through which the stem 13 is movably disposed. A coil spring 17 is arranged upon the stem 13 between this cross bar and the end wall 7 of the outer cutting member 5, the lower end of said spring being fixed to the guide 15 of the cutting member 9 and the upper end thereof secured to the stem 13.

In the use of the device, the cutting edges of the members 5 and 9 are disposed upon the dough and said members forced downwardly to cut through the same. The hand is now closed around the bail 12 and the thumb engaged with a button or head of the stem 13. This stem is now forced downwardly at the same time as the cutter is raised so that the dough within the inner cutting member 9 is compressed while the annular strip of dough between the opposed surfaces of the inner and outer cutting members is lifted. By shaking or jarring the cutter this annular cut off portion of the dough may be readily removed. In this manner it will be seen that doughnuts and similar cakes may be easily and quickly cut.

When the device is used for the cutting of cakes which are not to be provided with the central opening the inner cutting member 9 may be readily removed by simply disengaging the hooks 11 on the outer cutting member from the eyes 10.

From the foregoing it is believed that the construction and manner of use of my improved cake cutter will be clearly understood.

The device is extremely simple, durable in its construction and will efficiently perform the functions for which the same is devised.

The cutter members would be preferably constructed of sheet metal and it will be understood that while I have described the same as being cylindrical in form these members may be of any other form desired. The invention is also susceptible of a great many other minor modifications in the form, proportion and arrangement of parts without departing from the essential features or sacrificing any of the advantages thereof.

What I claim is:—

A dough cutter including a hollow outer member of cylindrical form, said member having one of its ends closed and provided therein with a central opening, a short inwardly projecting annular flange extending into the body of the outer member from the end wall thereof at the edge of said opening, an inner hollow cutting member movable with respect to said outer member, said inner member engaging closely with said flange and being braced thereby at one of its ends, to prevent lateral movement of the inner member with respect to the outer member, said inner member also having its latter end closed and having its closed end normally disposed upon a plane flush with the closed end of the outer member, a longitudinally disposed spring held stem movable through the closed end wall of said inner member, a plurality of radially disposed pressure arms on said stem engaging the wall of said inner member at their outer ends, a head formed upon the upper end of said stem, and co-engaging means on the end walls of said inner and outer members to removably secure said inner member in position and hold the same against movement with relation to said outer member.

In testimony whereof I hereunto affix my signature in the presence of two witnesses.

IDA L. HAINES.

Witnesses:
EDNA M. HIRES,
JENNIE W. DONAHOE.